United States Patent
Djordjevic et al.

(10) Patent No.: US 11,641,620 B2
(45) Date of Patent: May 2, 2023

(54) ACCESS CONTROL IN COMMUNICATIONS NETWORK COMPRISING SLICES

(71) Applicant: Telefonaktiebolaget LM Ericsson (publ), Stockholm (SE)

(72) Inventors: Branko Djordjevic, Herzogenrath (DE); Peter Hedman, Helsingborg (SE); Ralf Keller, Würselen (DE); Ann-Christine Sander, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 17/366,202

(22) Filed: Jul. 2, 2021

(65) Prior Publication Data

US 2021/0345236 A1 Nov. 4, 2021

Related U.S. Application Data

(63) Continuation of application No. 16/930,371, filed on Jul. 16, 2020, now Pat. No. 11,071,054, which is a continuation of application No. 16/314,464, filed as application No. PCT/EP2016/066904 on Jul. 15, 2016, now Pat. No. 10,757,645.

(51) Int. Cl.
| | | |
|---|---|---|
| H04W 4/00 | (2018.01) | |
| H04W 48/18 | (2009.01) | |
| H04W 8/18 | (2009.01) | |
| H04W 8/22 | (2009.01) | |
| H04W 12/08 | (2021.01) | |

(52) U.S. Cl.
CPC ............. *H04W 48/18* (2013.01); *H04W 8/18* (2013.01); *H04W 8/22* (2013.01); *H04W 12/08* (2013.01)

(58) Field of Classification Search
CPC ..... H04W 36/14; H04W 88/06; H04W 36/00; H04W 36/0011; H04W 36/18
USPC ........................................ 455/435.2; 370/338
See application file for complete search history.

(56) References Cited

U.S. PATENT DOCUMENTS

| | | |
|---|---|---|
| 9,191,865 B1 | 11/2015 | Paczkowiski et al. |
| 10,015,697 B2 | 7/2018 | Yang et al. |
| | (Continued) | |

FOREIGN PATENT DOCUMENTS

CN 105723774 A 6/2016

OTHER PUBLICATIONS

Secretary of SA WG2, "Draft Report of SA WG2 Meetings #115", SA WG2 Meeting #116, version 0.0.7, Vienna, Austria, Jul. 11, 2016, pp. 1-84, 3GPP.

(Continued)

*Primary Examiner* — Marcos Batista
(74) *Attorney, Agent, or Firm* — Coats & Bennett, PLLC (57) ABSTRACT

A method for operating a mobile entity in a mobile communications network having at least one slice is provided. The slice of the mobile communication to which the mobile entity intends to connect is determined. Additionally, whether a relationship can be identified in the mobile entity is determined. The relationship indicates whether the slice to which the mobile entity intends to connect is related to an access point of the slice. A request message is then transmitted to a radio access network (RAN) of the mobile communications network that includes the identified relationship.

29 Claims, 9 Drawing Sheets

(56) References Cited

U.S. PATENT DOCUMENTS

2012/0134259 A1* 5/2012 Bonnier ............. H04L 67/1034
370/328
2016/0073327 A1 3/2016 Clougherty et al.
2016/0353465 A1* 12/2016 Vrzic ................ H04W 28/0221

OTHER PUBLICATIONS

3rd Generation Partnership Project, "3rd Generation Partnership Project; Technical Specification Group Services and System Aspects; Study on the Security Aspects of the Next Generation System (Release 14)", Technical Report, 3GPP TR 33.899 V0.3.0, Jul. 1, 2016, pp. 1-77, 3GPP.

3rd Generation Partnership Project, "3rd Generation Partnership Project; Technical Specification Group Services and System Aspects; Study on Architecture for Next Generation System (Release 14)", Technical Report, 3GPP TR 23.799 V0.5.0, May 1, 2016, pp. 1-178, 3GPP.

* cited by examiner

ACCESS CONTROL IN COMMUNICATIONS NETWORK COMPRISING SLICES

RELATED APPLICATIONS

The present application is a continuation of U.S. patent application Ser. No. 16/930,371, which was filed Jul. 16, 2020, which is a continuation of U.S. patent application Ser. No. 16/314,464, which was filed on Dec. 31, 2018, now U.S. Pat. No. 10,757,645, which is a national stage application of PCT/EP2016/066904, which was filed Jul. 15, 2016, the disclosures of each of which are incorporated herein by reference in their entirety.

TECHNICAL FIELD

The present invention relates to a method for operating a mobile entity in a mobile communications network which comprises at least one network slice. The invention furthermore relates to a method for operating a radio access network entity and to a method for operating an entity configured to control a non-access stratum signalling of a mobile entity. Furthermore a system comprising two of the above mentioned entities is provided, a computer program and a carrier comprising the computer program.

BACKGROUND

Network slicing is an emerging concept, where a single physical network supports multiple logical networks called slices. Network slices may be isolated from each other, so that a failure of one network slice may not impact another network slice.

Currently it is not possible to inform a mobile entity, also called user entity or UE hereinafter, during attach or other UE-network interactions about the supported slices and APNs (Access Point Names). If the UE does not provide an APN, the UE is informed about the default APN in EPC (Evolved Packet Core) during initial attach. The present situation is as follows:
- The UE does not provide an APN during initial attach and the network assigns a default APN based on subscription (and the UE is informed which APN is assigned), or
- The UE provides an APN during initial attach or when requesting PDN connection establishment. The network checks whether the APN is part of the subscription, and in case of roaming, the network may check whether it is part of the roaming agreement.
- The network may also reject the initial attach or PDN (Packet Data Network) connection establishment if the requested APN is not known or not allowed for this subscriber. This is causing unnecessary signaling between UE and network until the UE has found out via try and error which APNs are supported in the currently used PLMN. If adding the support of network slices, then there will be further interactions between UE and network until both UE and network are "in agreement".

Accordingly, a need exists to avoid the above mentioned problems and to minimize a signalling between the mobile entity and the mobile communications network.

SUMMARY

This need is met by the features of the independent claims. Further aspects are described in the dependent claims.

According to the first aspect a method for operating a mobile entity in the mobile communications network is provided which comprises at least one network slice. According to one step of the method it is determined to which slice of the mobile communications network the mobile entity intends to connect. Furthermore the mobile entity determines whether a relationship can be identified in the mobile entity via which the slice to which the mobile entity intends to connect, is related to an access point of the determined slice, wherein when the relationship is found in the mobile entity the mobile entity transmits a request message to a radio access network of the mobile communications network including the identified relationship.

The Mobile entity contains information to which network slice the mobile entity intends to connect and comprises furthermore information about the access point of the corresponding network slice. When the mobile entity includes the information, the identified relationship, into a message transmitted to the mobile communications network, the latter can determine which access point to use for providing access to the desired network slice.

Furthermore, a method for operating a radio access network entity in the mobile communications network is provided which comprises the at least one slice. According to this method, a request message is received at the radio access network entity from the mobile entity in which access to the mobile communications network is requested. The request message comprises a relationship via which the slice, to which the mobile entity intends to connect, is related to an access point of the determined slice. Furthermore, the access point for the slice is determined to which the mobile entity intends to connect based on the received relationship. The request message is additionally forwarded to the determined access point.

Here the radio access network entity actively checks the request message and determines the access point to which the mobile entity wants to connect and forwards the received message to the determined access point.

Furthermore, a method for operating an entity configured to control a non-access stratum signaling of a mobile entity in a mobile communications network is provided, wherein the network comprises at least one slice. The method comprises the step of receiving a request message from the mobile entity. It is determined whether the request message comprises a network slice identifier with which the slice to which the mobile intends to connect can be identified. If the network slice identifier is present in the request message, it is checked whether the network slice identified by the network slice identifier is allowed for the mobile entity transmitting the request. The invention furthermore relates to the corresponding mobile entity, the radio access network entity and the entity configured to control a non-access stratum signaling.

Additionally, a system is provided comprising the mobile entity and comprising anyone of the radio access network entity and the entity configured to control the non-access stratum signaling.

A computer program is provided comprising program code to be executed by at least one processing unit of the mobile entity, the radio access network entity or the entity configured to control the non-access stratum signaling of the mobile entity, wherein execution of the program code causes the at least one processing unit to carry out the steps mentioned above and mentioned in further detail below. Additionally, a carrier comprising the computer program is provided.

It is to be understood that the features mentioned above or features yet to be explained below can be used not only in the respective combinations indicated, but also in other combinations or in isolation without departing from the scope of the present application. The features of the different embodiments may be combined with each other in other embodiments, unless explicitly mentioned otherwise.

BRIEF DESCRIPTION OF THE DRAWINGS

The foregoing and additional features and effects of the application will become apparent from the following detailed description when read in conjunction with the accompanying drawings, in which like reference numerals refer to like elements.

DETAILED DESCRIPTION

In the following embodiments of the invention will be described in detail with reference to the accompanying drawings. It is to be understood that the following description of embodiments is not to be taken in a limiting sense. The scope of the application is not intended to be limited by the embodiments described hereinafter or by the drawings which are to be taken demonstratively only.

The drawings are to be regarded as being representations and elements illustrated in the drawings are not necessarily shown to scale. Rather, the various elements are represented such that their function and the general purpose becomes apparent to a person skilled in the art. Any connection or coupling between functional blocks, devices, components or physical functional units shown in the drawings or described herein may be implemented by an indirect connection or coupling. A coupling between components may be established over a wired or wireless connection. Furthermore, functional blocks may be implemented in hardware, software, firmware or a combination thereof.

In the following description, APN, PDN (Packet Data Network) connection, initial attach, MME (Mobility Management Entity) and HSS (Home Subscriber Server) are used as functions and terms, but the application is applicable also to 5G networks and not only to 2G/3G/4G networks.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VoIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber. A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different. E.g. the subscription owner may be the parent, and the actual user of the UE could be a child of that parent.

Figure 5:
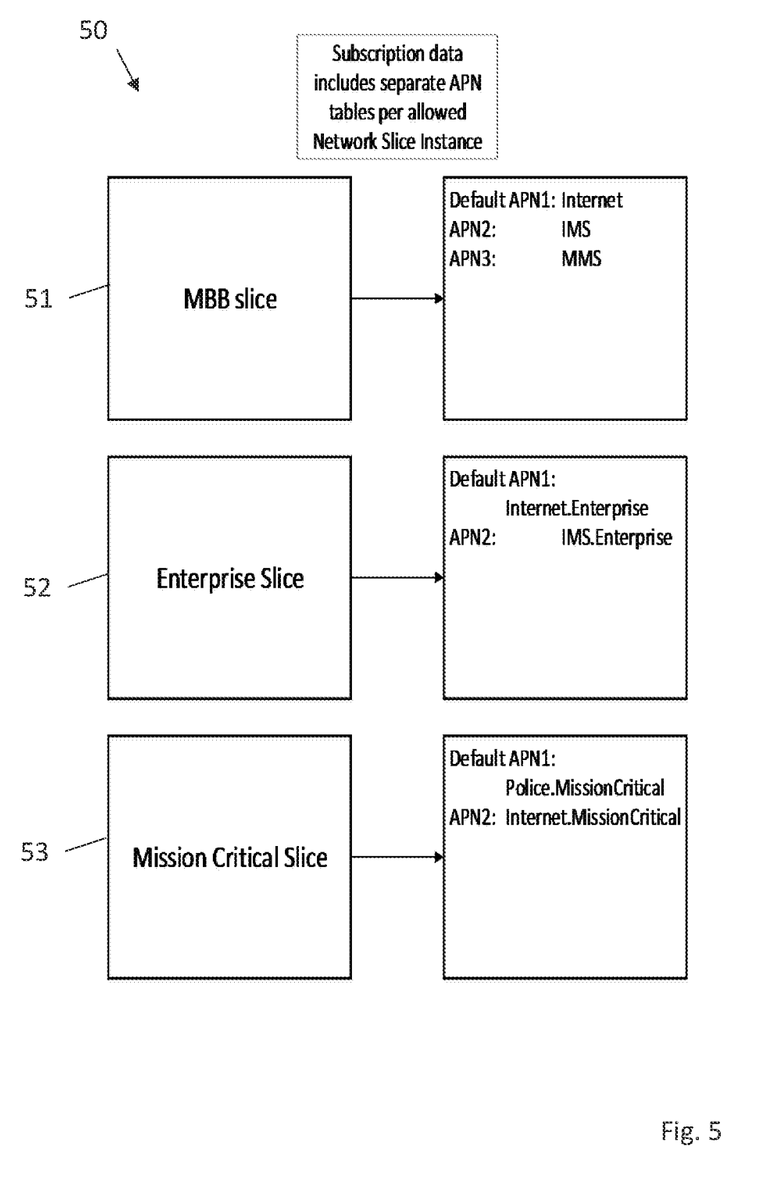
FIG. 5 schematically shows a mobile communications network having different slices, wherein different access points are provided for the different slices.

In the following an interaction between a mobile entity 100 and a mobile communications network 50 is explained as shown schematically in FIG. 5. The mobile communications network 50 comprises different slices 51 to 53, in the example shown a first network slice 51 as MBB (Mobile Broadband) slice. In addition, for each network slice different access point names, APNs, are provided, normally a default APN and other possible APNs. A further network slice 52 is indicated as Enterprise Slice, wherein this network slice may be provided for machine-to-machine communication. Furthermore, a third network slice 53, in the example shown a mission-critical slice, may be used by public authorities, such as the police etc., or disaster recovery forces.

The mobile entity 100 has logic to store for each PLMN (Public Land Mobile Network) and APN which Network Slice ID (NSI ID) to use. Accordingly, the mobile entity has a table which provides a relation between the access point, the network slice and the mobile communications network in which the access point and the network slice are located. This information may be updated based on feedback received from the network. Depending on the content stored in a relation table, the mobile entity performs an attach, creates a PDN connection and the information may be updated based on feedback received by the mobile entity from the network. In connection with FIG. 1 a message flow describing the slice selection by a mobile entity is discussed in more detail. In step S0 the network and the UE are configured. This can mean that the UE may be configured with the NSI ID to use.

Figure 1:
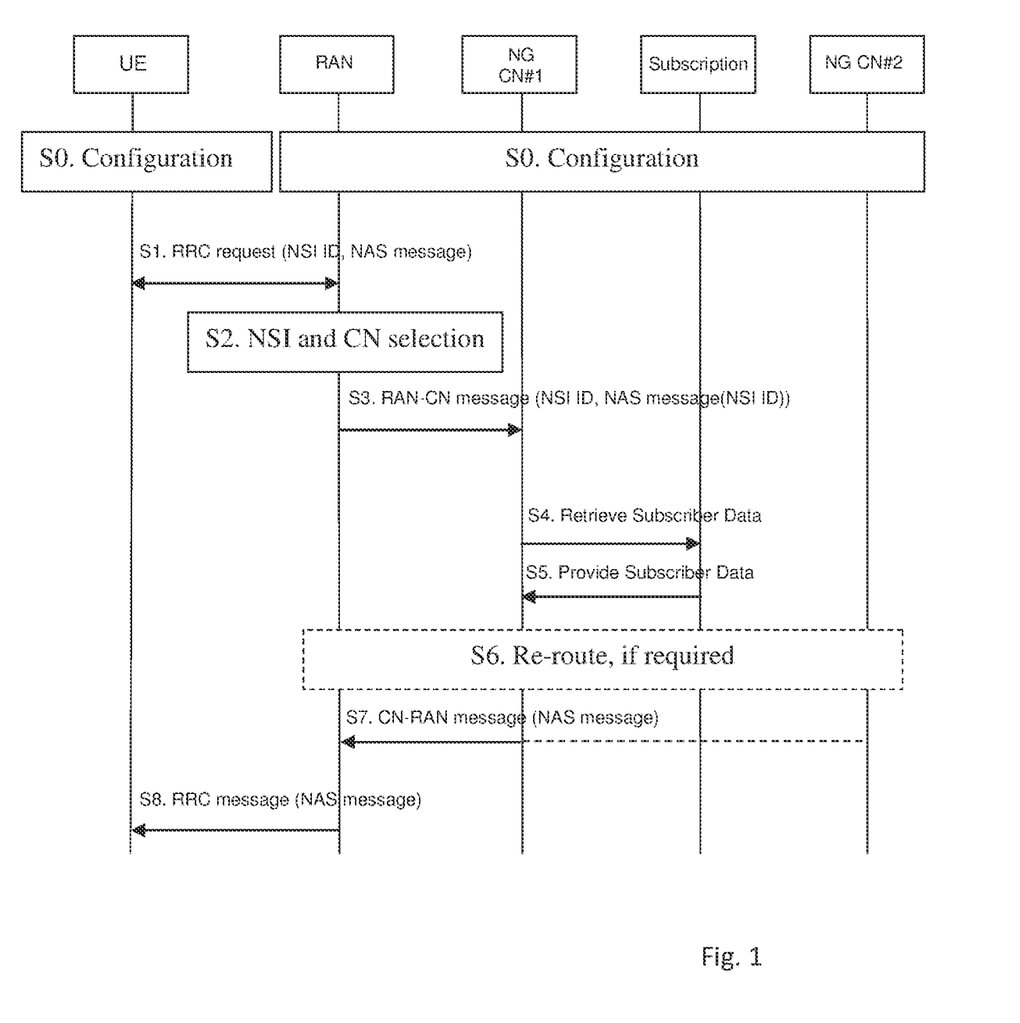
FIG. 1 schematically shows a message flow between involved entities when a network slice instance is selected at an attach procedure of a mobile entity.

S1: The UE sends an RRC (Radio Resource Control) message (containing at least PLMN information, User identity, UE capabilities, NSI ID, NAS (Network Access Stratum) Message) to the RAN (Radio Access Network). The NSI ID is included if the UE has been configured with it, see step S0. At Attach the NAS Message is an attach message. The NAS message may include a request for information about network-supported slice types and APNs per slice. UE may optionally include the list of slice types supported by the UE, including an indication of which slices should be established by the network.

S2: The RAN selects an NSI corresponding to the NSI ID (if provided by the UE) and the selected PLMN. The RAN then selects an NG CN instance within the NSI. If the UE did not provide any NSI ID, then RAN selects an NSI (e.g. a default NG CN instance) for the selected PLMN.

S3: The RAN forwards the NAS message to the selected NG CN Instance. Along with the NAS message from the UE, the RAN includes the NSI ID from the UE, if provided by the UE.

S4: The NG CN #1 instance may interact with the Subscription (5G HSS) to retrieve e.g. the subscribed network slice type and the subscribed APNs etc.

S5: The subscription provides the subscribed network slice type(s) along with other subscription information such as subscribed APNs per slice type. The NG CN #1 Instance examines the NSI ID received from RAN and UE, the network slice type provided by the Subscription, other information available (e.g. UE CN capabilities, other subscription information, SLA (Service Level Agreement) information, local configuration), and verifies that the selected NG CN #1 Instance is suitable to serve the UE. If the UE is authorized to access the network slice and the NG CN #1 Instance is suitable to serve the UE the flow continues at step 7.

S6: If the Network Slice Instance is not suitable to serve the UE, the NG CN #1 Instance initiates a re-route to an appropriate Network Slice Instance by providing the target NSI ID to the RAN (and e.g. original RAN message) which invokes the appropriate NG CN instance (NG CN #2). The NG CN #2 verifies that the NG CN #2 is suitable to serve the UE based on received information during re-route procedure and information fetched from the Subscription. The UE may also be rejected in case there is no other appropriate NG CN instance available, parameters are lacking etc.

S7: The target NG CN Instance (CN #1 or CN #2) assigns an NSI ID and replies by sending a RAN-CN message including the NAS message for the UE (e.g. Attach Accept).

S8: The RAN forwards the NAS message to the UE. If provided, the UE stores the subscribed APNs per network slice type (for this PLMN). If stored, the UE shall indicate the provided NSI ID always when connecting to the network in that PLMN.

Figure 2:
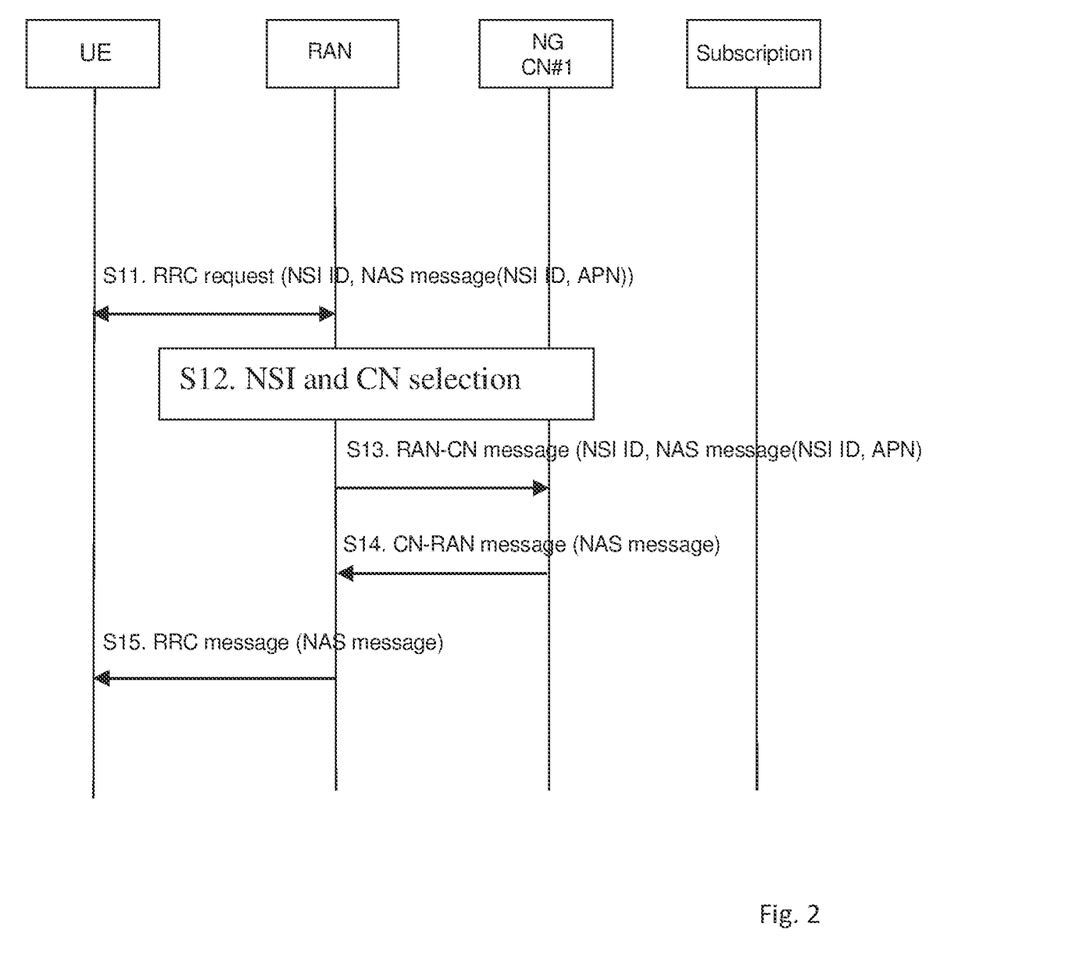
FIG. 2 schematically shows a message flow between involved entities when a network slice instance is selected according to another option.

In connection with FIG. 2 a network slice selection method is shown in connection with a session management message which may be sent at the same time as the attach message. The UE has already been attached to the network and been provided with information as per flow in FIG. 1. Optionally, the NAS SM (Session Management) message can be sent at the same time as the attach message.

The UE selects a service to invoke and decides the APN to use for that service. The term "APN" is here used to denote the APN-NI part of the APN, as known from 3GPP TS 23.003.

S11: The UE sends an RRC (Radio Resource Control) message (PLMN information, User identity, UE capabilities, NSI ID, NAS message (APN)) to the RAN. The NAS message is an SM (Session Management) message which optionally includes the APN (or equivalent) that the UE wants to connect to.

S12: The RAN selects an NSI corresponding to the NSI ID (if provided by the UE) and the selected PLMN. The RAN then selects a Next Generation (NG) Core Network (CN) instance within the NSI according to the NSI ID (or a separate temporary ID similar as per existing EPS (Evolved Packet System)).

S13: The RAN forwards the NAS message to the selected NG CN Instance. Along with the NAS message from the UE, the RAN includes the NSI ID from the UE, if provided by the UE.

S14: The target NG CN Instance verifies the UE request and provided NSI ID and APN. If needed, the NG CN instance assigns an NSI ID for the selected APN and replies to the UE by sending a RAN-CN message including the NAS message for the UE (e.g. SM Accept).

S15: The RAN forwards the NAS message to the UE. The UE stores the provided APN and NSI ID relation for the PLMN. If stored, the UE shall indicate the NSI ID always when connecting to the network in that PLMN, and the provided APN.

In addition to the steps discussed above, the UE supporting multiple slice types may also indicate in the initial attach or any other procedures where the UE interacts with the network to request information about network supported slice types and APNs per slice. This may be done only to the default slice, but in principle can be done to any network slice or to a dedicated server in the network. The UE 100 may optionally include the list of slice types and APNs supported by the UE or slices subscribed to by the subscriber, including an indication of which PDN connections to the supported APNs should be established by the network. The network entity of the core network, especially the entity configured to control a non-access stratum signaling, such as the MME (Mobility Management Entity) or a network slice manager and its control part may indicate to the HSS that it needs information about supported slices. One single logical HSS may be provided, but in the case of a dedicated HSS per slice type, the query may be redirected to the corresponding HSS. While the network may support a large amount of slice types and APNs, the list for a particular UE is dependent on the subscription of the subscriber using the UE and other policies of the mobile entity. In case the list gets too long, the network may only indicate the most important ones, based on policies, with an indication to the UE that the UE may request an extended list from the network, if required.

The HSS provides the list of supported slice types, by way of example slice type identifiers, and the lists of supported APN per slice type to the MME. The list of supported slice types may be limited by the HSS prior to sending it to the MME in order to address, e.g. roaming agreements.

The MME may further limit or condense the list of supported slice types and supported APNs to the locally supported APNs, by way of example due to local policy or due to a roaming agreement, and provides a resulting limited list to the UE. This list may contain further information regarding which connectivity is auto established by the network and which one needs to be established by the UE. By way of example, the UE may receive the information such as slice type #1: APN1, auto-established PDN connection,
slice type #2: APN2, not auto-established PDN connection,
slice type #3: APN3, auto-established PDN connection, APN1, not auto-established PDN connection.

It is possible that the MME limits the information to one slice type in the case of inbound roaming subscribers. If the HSS does not support slices, all supported APNs may be mapped to a default slice by the MME and only the default slice with all APNs is provided to the UE.

If required, the MME performs needed actions for any slice type or APN in order to ensure basic connectivity.

The UE uses the received information to establish per supported slice type the needed PDN connections to the APNs. If the network does not support a slice type required by the UE, the UE may decide to:

disable the use of the slice on the UE;
use a fallback communication method, e.g. the UE attaches to the default slice and either uses the default APN or selects a suitable MBB APN to establish a secure tunnel to a configured network node;
reselect a PLMN, by way of example a slice/APN combination is needed for interaction with the network. Hence, the UE may try different PLMNs in order to find a PLMN supporting the needed slice/APN combination.

Figure 3:
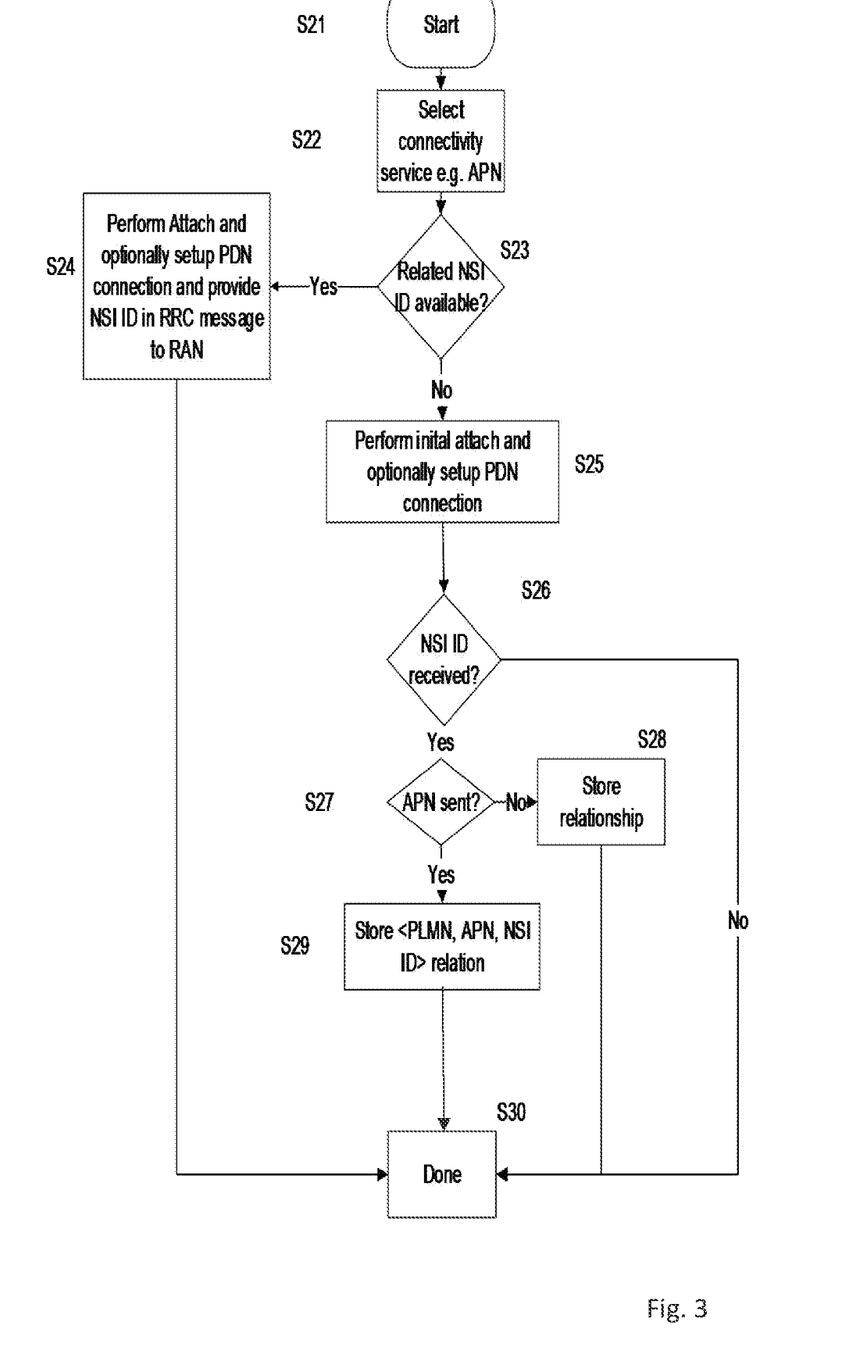
FIG. 3 schematically shows a flowchart involving steps carried out at a mobile entity when accessing a slice of a mobile communications network.

In connection with FIG. 3 steps are summarized which are carried out at the mobile entity 100. The method starts in step S21 and in step S22 the UE selects the connectivity service to use. By way of example, the UE has been provisioned with APN to use for the request from the application or no APN is selected and the UE will implicitly request a default APN to be used for the UE.

S23, S24: The UE has logic to store per PLMN (e.g. per equivalent PLMNs) and APN which Network Slice ID (NSI ID) to use. The NSI ID may be provided to the UE e.g. by provisioning/configuration or as part of a previous communication with the PLMN network (in a dedicated information or as part of the APN provided by the network). If the NSI ID is available, the UE performs an attach to the network and optionally setup a PDN connection/PDU session and provides the NSI ID in an RRC (Radio Resource Control) message to the RAN (assume this is done first or in parallel to the next step), and optionally to the CN in a CN related message (e.g. as part of the decorated/appended APN or in a separate information element).

S25: If no NSI ID is available for the PLMN and APN, the UE attaches to the network and optionally sets up a PDN connection/PDU session without providing any NSI ID.

S26: If no NSI ID received from the network (network does not support network slicing), the UE does not update its <PLMN, APN, NSI ID> relation table.

S27, S28: If NSI ID is received, the UE will need to update the <PLMN, APN, NSI ID> relation table, and if no APN was sent by the UE, the received APN is considered as the default APN. The UE updates the <PLMN, APN, NSI ID> relation table using the received APN. If no PDN connection/PDU session was set up, the UE updates the <PLMN,NSI ID> relation table (null APN) i.e. the NSI ID that the UE will provide in RRC messages is not related to any APN/PDN connection/PDU session.

S29: If APN was provided, the UE updates the <PLMN, APN, NSI ID> relation table using the received APN from the network. The NSI ID may be received separately or as part of the received APN (e.g. prefix/suffix/decorated).

Figure 4:
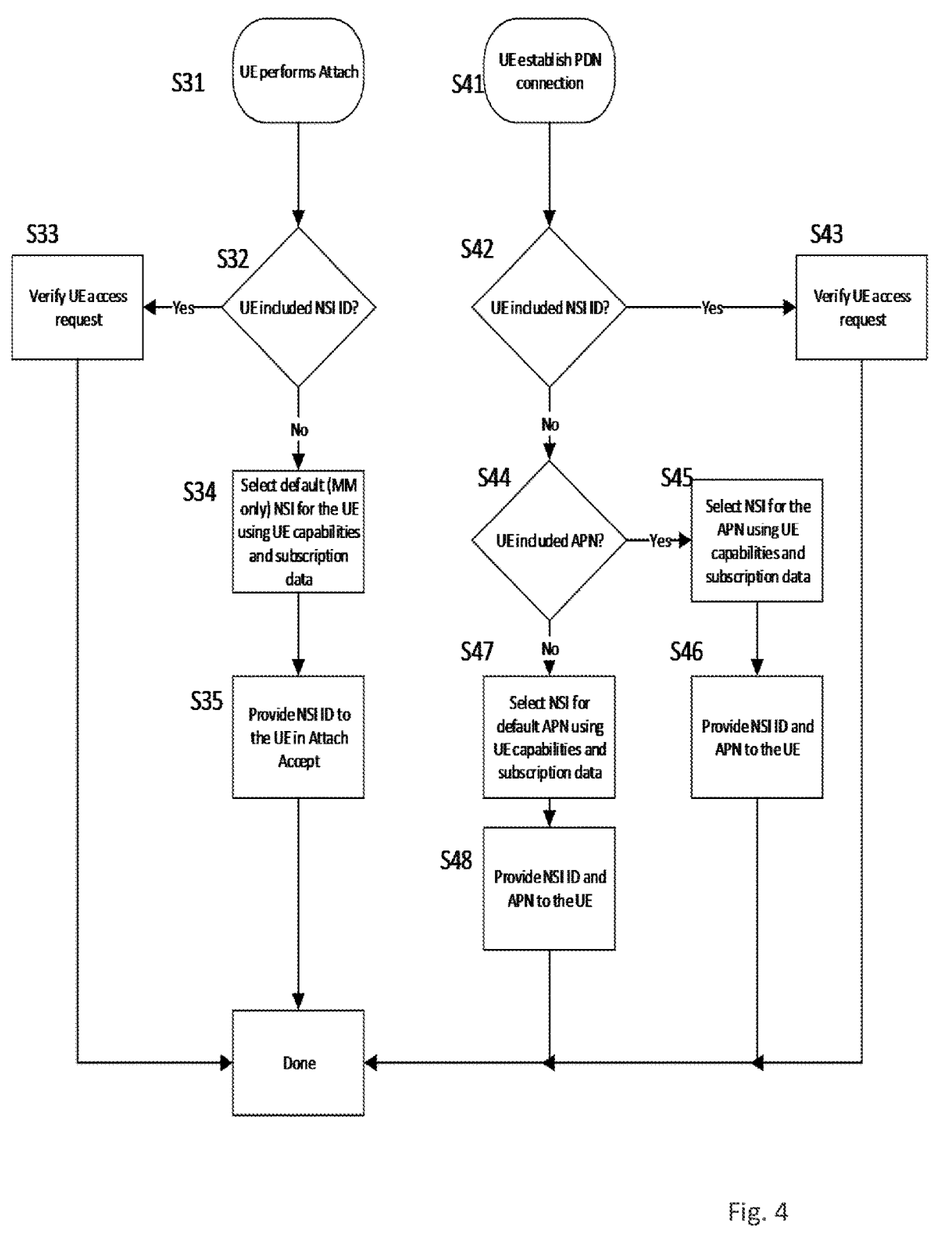
FIG. 4 shows a flowchart carried out at a network entity during an attach procedure of a mobile entity as shown in FIG. 3.

As far as the network entity, the entity that is controlling the non-access stratum signaling is concerned, the steps carried out at this entity are summarized in connection with FIG. 4.

S31: UE performs an Attach, and
S32: CN checks if the UE provided an NSI ID (i.e. as part of UE-CN Attach message e.g. as part of the (decorated) APN or in a separate information element or forwarded by the RAN).
S33: If the UE provided an NSI, the CN checks such that the NSI ID is allowed to be used by the UE and is the same as forwarded by the RAN.
S34: If no NSI ID is provided, then the CN selects an NSI to use for the UE, based on subscription information, UE capabilities etc.
S35: The CN optionally provides an NSI ID in the Attach Accept message to the UE.
S41: The UE requests a PDN connection/PDU session to be established.
S42: The CN checks if the UE provided an NSI ID, e.g. as part of the APN or in a separate information element.
S43: If the UE provided an NSI, the CN checks such that the NSI ID is allowed to be used by the UE.
S44: If no NSI ID is provided, then the CN checks whether the UE provided an APN.
S45: If the UE provided an APN, then the CN selects an NSI to be used for the APN based on subscription information, UE capabilities etc.
S46: The CN provides the NSI ID to use in relation to the APN. The NSI ID may be provided separately or as part of the APN provided to the UE (prefix/postfix).
S47: If no APN was provided by the UE, then the CN selects an NSI to be used for the default APN based on subscription information, UE capabilities etc.
S48: The CN provides the NSI ID to use in relation to the APN. The NSI ID may be provided separately or as part of the APN provided to the UE (prefix/postfix).

As far as the network with the different slices is concerned, the subscription data includes separate APN tables per allowed network slice. Furthermore, at least the overlapping or all services get differentiated APNs, e.g. by pre- or postfixing (append/decorate) a differentiator per NSI/DCN. The differentiator may be the NSI type, NSI ID, DCN ID or anything else that the core network can use to know which NSI/DCN the APN corresponds to.

Figure 6:
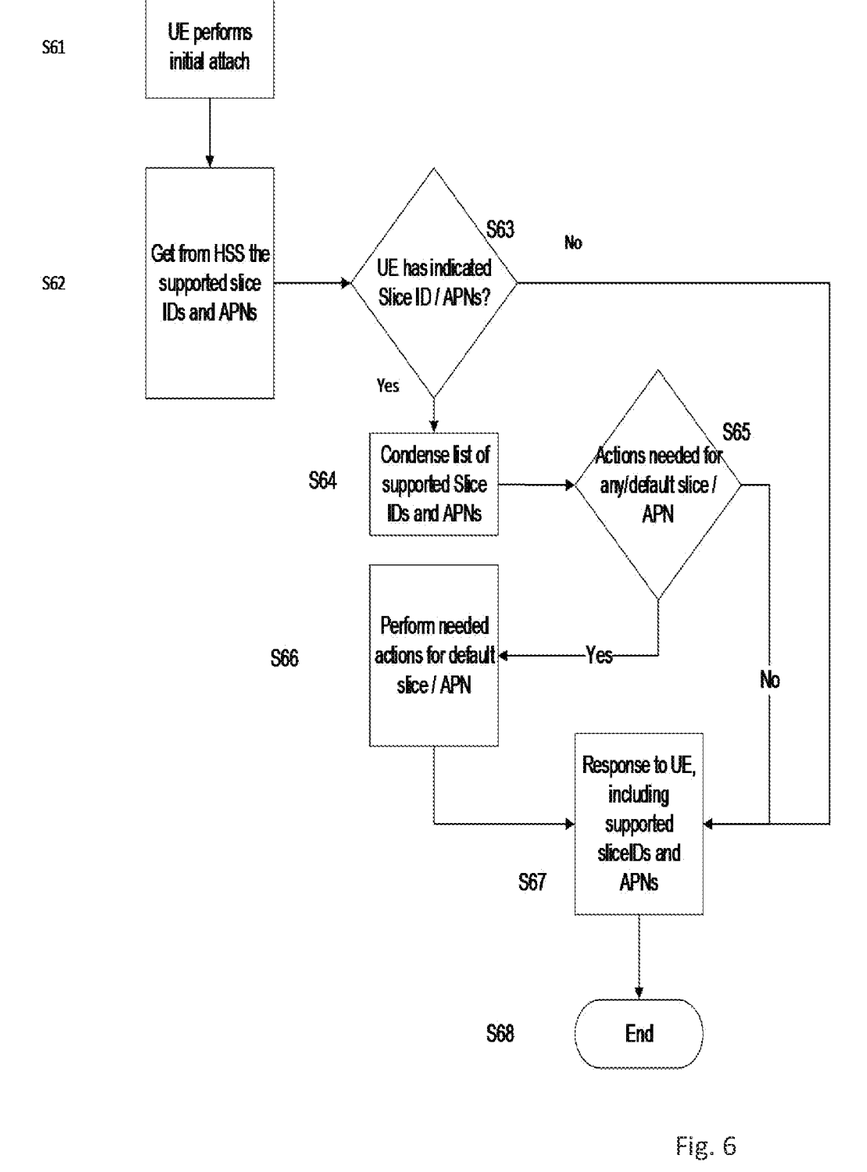
FIG. 6 schematically shows a flowchart of steps carried out in the network when a mobile entity intends to connect to a slice of the network.

In connection with FIG. 6 the steps are summarized how the UE is informed about the relationship between the access point and the slice.

In step S61 the UE performs an initial attach and requests information about network supported slice types and APNs per slice. The network node, i.e. the entity controlling the non-access stratum signaling (for example the MME) may contact the HSS and get from the HSS the supported slice IDs and the APNs in step S62.

In step S63 it is checked whether the UE has indicated the slice ID related to the access point names. If this is the case, a shorted or condensed list of the supported slices and the corresponding APNs is generated. In step S65 it is checked whether any actions are needed for any of the slices, the default slice and the corresponding APN. If this is the case, the needed actions are performed for the default slice and the corresponding APN or for any of the other required slices, e.g. PDN connection establishment. Last but not least in step S67 an attach response is transmitted to the mobile entity including the supported slices and the supported APNs. The method ends in step S68.

Figure 7:
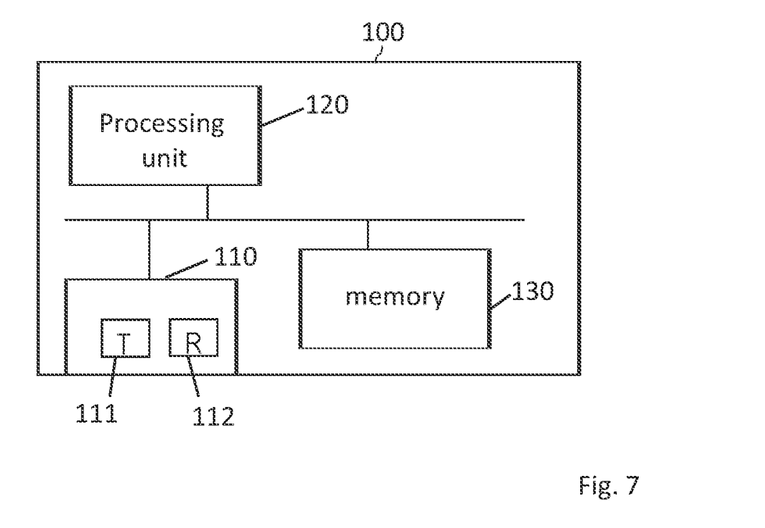
FIG. 7 schematically shows an exemplary view of a mobile entity involved in the steps discussed in connection with FIGS. 1 to 6.

FIG. 7 shows a schematic architectural view of a mobile entity 100. The mobile entity 100 comprises an interface 110 which is provided for transmitting user data or control messages to other entities via a transmitter 111 and to receive user data and control messages from other entities using receiver 112. The interface is especially qualified to communicate with the different entities as discussed above in the different flowcharts of FIGS. 1 to 6. The mobile entity furthermore comprises a processing unit 120 which is responsible for the operation of the mobile entity 100. The processing unit 120 comprises one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above described functionalities in which the mobile entity is involved.

Figure 8:
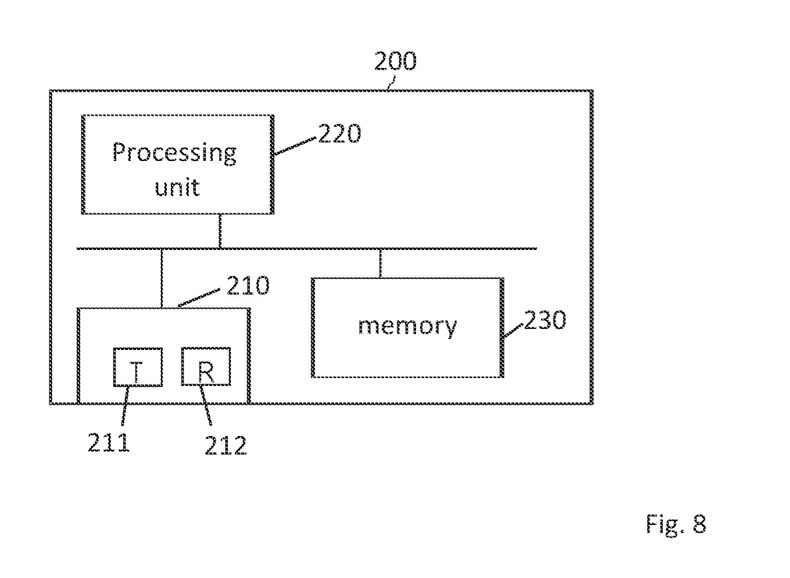
FIG. 8 shows an exemplary view of a radio access network entity involved in the message flows discussed in connection with FIGS. 1 to 6.

In connection with FIG. 8 a schematic architectural view of a RAN entity is shown which receives the request message from the mobile entity, determines the network slice to which the request message such as the attach request should be transmitted based on the network slice identifier and forwards the received message to the determined access point. The radio access network entity 200 comprises an interface 210 which is provided for transmitting user data or control messages to other entities via transmitter 211 and for receiving user data and/or control messages from other entities using receiver 212. The interface is especially qualified to communicate with the other entities as discussed above in the different flowcharts 1 to 6. A processing unit 220 is provided which is responsible for the operation of the radio network access entity. The processing unit 220 comprises one or more processors and can carry out instructions stored on a memory 230, wherein the memory may include a read-only memory, a random access memory, a mass storage or the like. The memory can furthermore include suitable program code to be executed by the processing unit 220 so as to implement the above described functionalities in which the radio access node is involved.

Figure 9:
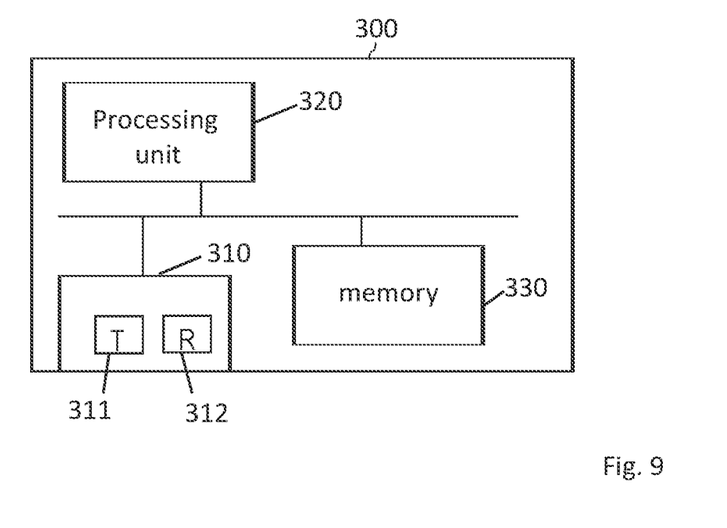
FIG. 9 shows a high level exemplary view of a network entity configured to control the non-access stratum signaling of the mobile entity.

FIG. 9 shows a schematic architectural view of an entity which controls the non-access stratum signaling of the mobile entity in the core network. This entity 300 comprises an interface 310 which is provided for the exchange of user data or control messages with the other entities discussed above, wherein transmitter 311 is used for the transmission and receiver 312 is used for the reception of data. The processing unit 320 is provided, which is responsible for the operation of the core network entity 300. The processing unit can comprise one or more processors and can carry out instructions stored on memory 330. The memory can furthermore store a suitable program code to be executed by the processing unit 320 so as to implement the above described functionalities of the core network entity 300.

The entities of FIGS. 8 and/or 9 may also be realized by a virtual network function (VNF), e.g. instantiated by a VNF manager on a generic hardware platform suited for hosting VNFs.

Figure 10:
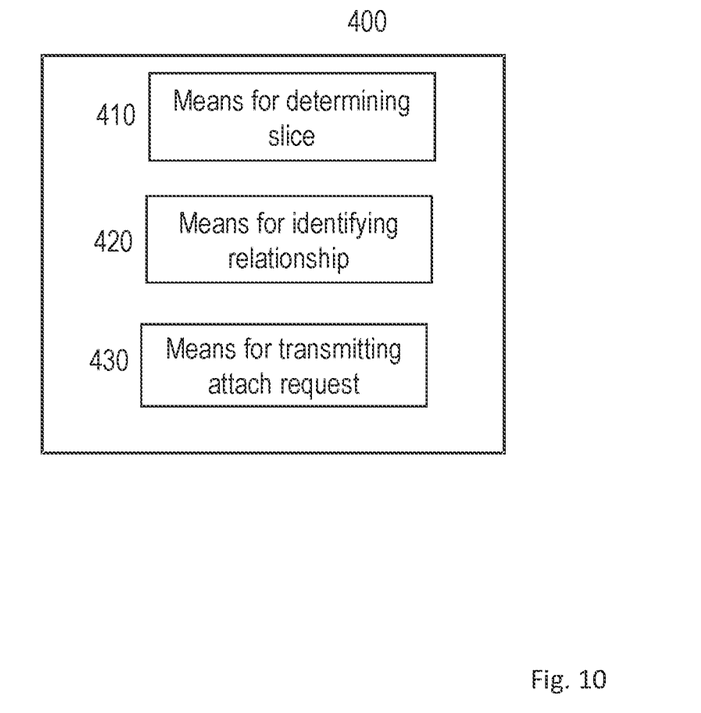
FIG. 10 schematically shows a mobile entity according to a further embodiment which intends to connect to a certain slice of a mobile communications network.

FIG. 10 shows a further schematic view of a mobile entity configured to operate as discussed above or below. The mobile entity 400 comprises means for determining to which slice of the communications network the mobile entity wants to connect. Furthermore, means 420 are provided to determine whether a relationship can be found in which the access point is related to the desired slice and, if the relationship is found, to determine the relationship. Additionally, means 430 are provided which transmit a request message to the radio access network of the mobile communications network including the identified relationship.

Figure 11:
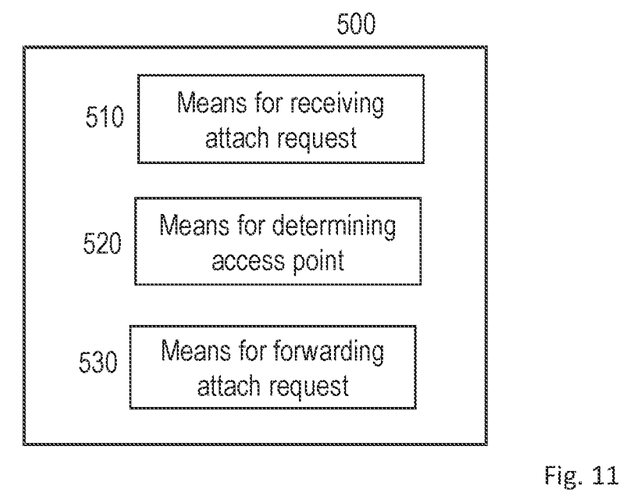
FIG. 11 schematically shows a radio access network entity according to a further embodiment involved in the method steps shown in FIGS. 1 to 6.

FIG. 11 shows a schematic view of a radio access network entity according to a further embodiment. This radio access network entity 510 comprises means for receiving an attach request from the mobile entity. The radio access network entity 520 furthermore comprises means for determining an access point based on the information contained in the received message and comprises means 530 for forwarding the received message to the determined access point.

Figure 12:
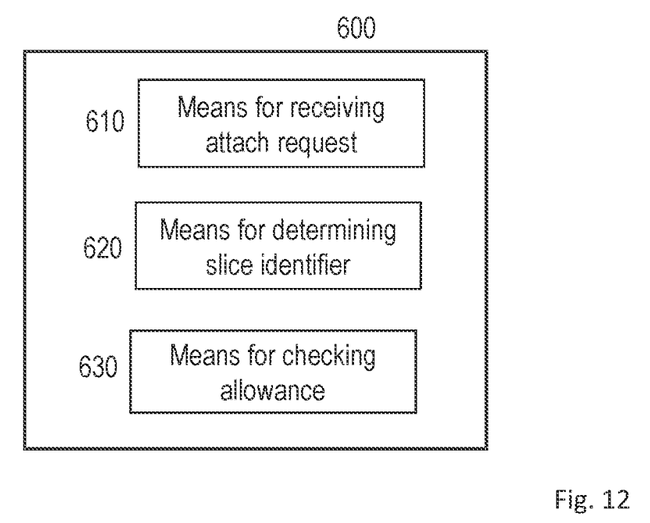
FIG. 12 shows a schematic view of an entity configured to control the non-access stratum signaling involved in any of the method steps explained in connection with FIGS. 1 to 6.

In connection with FIG. 12 a further embodiment of a network node configured to control the non-access stratum signaling of the mobile entity is shown. This entity 600 comprises means 610 for receiving a request message from the mobile entity, e.g. the attach request. Furthermore, means 620 are provided for determining the slice identifier if present in the received message. Based on the identified network slice identifier, means 630 are provided for checking whether the network slice identified by the network slice identifier is allowed for the mobile entity transmitting the request.

From the above discussion some general conclusions can be drawn:

As far as the mobile entity is concerned, the mobile entity may receive the relationship which relates the access point to the slice from the mobile communications network and stores the relationship relating to the access point and the corresponding slice in the mobile entity. Furthermore, it is possible that the access point received from the mobile communications network may be stored as a default access point if no information about an access point has been transmitted to the network beforehand. The request message transmitted to the network may be an attach request. Furthermore, it can be any mobility or session related message such as a registration request, a TAU (Tracking Area Update) request or any similar mobility message or a PDN connectivity request, a PDU session setup or similar session related message.

When information about the access point has been transmitted to the network before a relationship is received from the network, the received relationship may be stored as a new relationship relating the access point mentioned in the received relationship to the slice mentioned in the corresponding relationship. Accordingly, the network can update the information stored in the mobile entity.

The relationship in the mobile entity may be stored in a relation table which provides the relation between the access point, the network slice and the mobile communications network. As mentioned above, the relationship may additionally contain information about the mobile communications network to which the slice and the access point belong. If, however, no relationship can be identified in the mobile entity, the request message is transmitted to the radio access network without the relationship.

The relationship can comprise a network slice identifier identifying the slice to which the mobile entity intends to connect and the access node of the slice.

When the mobile entity determines that the communications network does not support the slice to which the mobile entity intends to connect, different options exist at the mobile entity: According to a first option, the mobile entity may attach to a default slice of the network. Furthermore, the mobile entity may search for a mobile communications network which supports the desired relationship between slice and access point.

As far as the entity in the core network is concerned controlling the non-access stratum signaling, this entity receives the request message from the mobile entity, and if no network slice identifier is present in the request message, an attach response message is transmitted to the mobile entity. This attach response message includes a network slice identifier for the mobile entity determined based on at least one of subscriber data for the mobile entity and capabilities of the mobile entity.

The network entity may furthermore determine whether information about an access point has been received from the mobile entity. If this is the case, a network slice identifier identifies the slice to which the mobile entity intends to connect. Furthermore, a relationship is generated using the determined network slice identifier via which the network slice is related to an access point of the slice and the relationship is transmitted to the mobile entity.

If no information is found, a network slice identifier identifying the slice to which the mobile entity intends to connect is determined with a default access point to be used by the mobile entity. Furthermore, a relationship is generated via which the network slice identifier is related to the default access point of the determined slice. Additionally, the relationship is transmitted to the mobile entity.

Additionally, the core network node may carry out the following steps: It may determine the mobile entity which transmitted the request message. Furthermore, it is determined to which slices the subscriber of the mobile entity has subscribed and a list of subscription slices for the mobile entity is generated using the information about the slices to which the subscriber has subscribed and is transmitted to the mobile entity. For determining which slices the subscriber of the mobile entity has subscribed, the core network entity may perform the following steps: It may transmit the slice request to a subscriber database of the mobile communications network by which information about the slices to which the subscriber of the mobile entity has subscribed is requested. Furthermore, a slice response is received from the subscriber database including information about the slices to which the subscriber of the mobile entity has subscribed. The list of supported slices is then determined based on the information received from the subscriber database.

The above discussed invention has several advantages. First of all, it provides support for multiple network slice types for the mobile user and the network. Additionally, a logic is provided to maintain a relationship between the PLMN, APN and the NSI ID. This all leads to a reduced signaling between the UE and the network. Furthermore, the signaling between the UE and the network is minimized and it is avoided that the mobile entity does some try and error to find out which slice and APN combination is supported by the network.

The invention claimed is:

1. A method for operating a mobile entity in a mobile communications network that supports at least one slice, the method implemented by the mobile entity and comprising:
sending a request message to a radio access network (RAN) entity in the mobile communications network, the request message comprising a first network slice identifier identifying a slice to which the mobile entity intends to connect;
receiving a response to the request message, wherein the response comprises a second network slice identifier the mobile entity is allowed to connect; and
transmitting a connection request comprising the second network slice identifier and a related access point name when connecting to a slice of the mobile communication network.

2. The method of claim 1 wherein the request message is a registration/Attach request message.

3. The method of claim 1 further comprising:
receiving, from the mobile communications network, a relationship indicating that the slice to which the mobile entity intends to connect is related to an access point name; and
storing the relationship in the mobile entity.

4. The method of claim 3 further comprising storing the access point name received from the mobile communications network as a default access point if no information about an access point name has been transmitted to the mobile communications network.

5. The method of claim 3 wherein, when information about the access point name has been transmitted to the mobile communications network before the relationship is received from the mobile communications network, the received relationship is stored as a new relationship relating the access point name identified in the received relationship to the slice mentioned in the relationship.

6. The method of claim 3 wherein the relationship is stored in the mobile entity in a relation table providing a relation between the access point name, the network slice, and the mobile communications network in which the access point name and the network slice are provided.

7. The method of claim 3 wherein the relationship also contains information about the mobile communications network with which the slice and the access point name belong are associated.

8. The method of claim 1 wherein, if no relationship can be identified in the mobile entity, the request message is transmitted to the RAN without the relationship.

9. The method of claim 3 wherein the relationship comprises a network slice identifier identifying the slice to which the mobile entity intends to connect and the access controlling function of the slice.

10. The method of claim 1 wherein the first network slice identifier and the second network slice identifier are the same.

11. The method of claim 1 further comprising:
determining the related access point name to use when connecting to the slice of the mobile communication network; and
wherein the connection request to connect to the slice of the mobile communication network further comprises an indication of the related access point name to use for the connection.

12. A mobile entity for operating in a mobile communications network comprising at least one slice, the mobile entity comprising:
processing circuitry;
memory containing instructions executable by the processing circuitry whereby the mobile entity is operative to:
send a request message to a radio access network (RAN) entity in the mobile communications network, the request message comprising a first network slice identifier identifying a slice to which the mobile entity intends to connect;

receive a response to the request message, wherein the response comprises a second network slice identifier the mobile entity is allowed to connect; and transmit a connection request comprising the second network slice identifier and a related access point name when connecting to a slice of the mobile communication network.

13. The mobile entity of claim 12 wherein the request message is a registration/Attach request message.

14. The mobile entity of claim 12 wherein the processing circuitry is further configured to:

receive, from the mobile communications network, a relationship indicating that the slice to which the mobile entity intends to connect is related to an access point name; and store the relationship in the mobile entity in the memory.

15. The mobile entity of claim 14 wherein the processing circuitry is further configured to store the access point name received from the mobile communications network as a default access point if no information about an access point name has been transmitted to the mobile communications network.

16. The mobile entity of claim 14 wherein when information about the access point name has been transmitted to the mobile communications network before the relationship is received from the mobile communications network, the processing circuitry is further configured to store the received relationship as a new relationship relating the access point name identified in the received relationship to the slice mentioned in the relationship.

17. The mobile entity of claim 14 wherein the processing circuitry is further configured to store the relationship in the mobile entity in a relation table that provides a relation between the access point name, the network slice, and the mobile communications network in which the access point name and the network slice are provided.

18. The mobile entity of claim 14 wherein the relationship further comprises information about the mobile communications network with which the slice and the access point name belong are associated.

19. The mobile entity of claim 12 wherein, if no relationship can be identified in the mobile entity, the processing circuitry is further configured to send the request message to the RAN without the relationship.

20. The mobile entity of claim 12 wherein the relationship comprises a network slice identifier identifying the slice to which the mobile entity intends to connect and the access controlling function of the slice.

21. The mobile entity of claim 12 wherein the first network slice identifier and the second network slice identifier are the same.

22. The mobile entity of claim 12 wherein the processing circuitry is further configured to:

determine the related access point name to use when connecting to the slice of the mobile communication network; and wherein the connection request to connect to the slice of the mobile communication network further comprises an indication of the related access point name to use for the connection.

23. A method for operating a network entity in a mobile communications network supporting at least one slice, the method implemented by the network entity and comprising:

receiving, from a mobile entity, a request message in the mobile communications network, the request message comprising a first network slice identifier identifying a slice to which the mobile entity intends to connect;

sending, to the mobile entity, a response to the request message, wherein the response comprises a second network slice identifier the mobile entity is allowed to connect, the second network slice identifier selected based on subscription information of the mobile entity; and receiving, from the mobile entity, a connection request message to establish a connection using the second network slice identifier and a related access point name when connecting to a slice of the mobile communication network.

24. The method of claim 23 further comprising:

determining the second network slice identifier for the slice to be used for the connection;

determining the related access point name to be used when connecting to the slice of the mobile communication network;

associating the related access point name with the second network slice identifier; and sending the association of the related access point name and the second network slice identifier in the response to the mobile entity.

25. The method of claim 23 further comprising:

determining the second network slice identifier for the slice to be used for the packet data connection;

associating the related access point name with the network slice; and sending the association of the related access point name and the second network slice identifier in the response to the mobile entity.

26. A network entity configured to control a non-access stratum signaling of a mobile entity in a mobile communications network comprising at least one slice, the network entity comprising:

processing circuitry; and memory containing instructions executable by the processing circuitry whereby the network entity is operative to:

receive, from the mobile entity, a request message in the mobile communications network, the request message comprising a first network slice identifier identifying a slice to which the mobile entity intends to connect;

send, to the mobile entity, a response to the request message, wherein the response comprises a second network slice identifier the mobile entity is allowed to connect, the second network identity selected based on subscription information of the mobile entity; and receive, from the mobile entity, a connection request message to establish a connection using the second network slice identifier and a related access point name when connecting to a slice of the mobile communication network.

27. The network entity of claim 26 the processing circuitry is further configured to:

determine the second network slice identifier for the slice to be used for the connection;

determine the related access point name to be used when connecting to the slice of the mobile communication network;

associate the related access point name with the second network slice identifier; and send the association of the related access point name and the second network slice identifier in the response to the mobile entity.

28. The network entity of claim 26 wherein the processing circuitry is further configured to:
- determine the second network slice identifier for the slice to be used for the packet data connection;
- associate the related access point name with the network slice; and
- send the association of the related access point name and the second network slice identifier in the response to the mobile entity.

29. The network entity of claim 26 wherein the network entity is an Access and Mobility Management Function (AMF).

\* \* \* \* \*

UNITED STATES PATENT AND TRADEMARK OFFICE
CERTIFICATE OF CORRECTION

| | | |
|---|---|---|
| PATENT NO. | : 11,641,620 B2 | Page 1 of 1 |
| APPLICATION NO. | : 17/366202 | |
| DATED | : May 2, 2023 | |
| INVENTOR(S) | : Djordjevic et al. | |

It is certified that error appears in the above-identified patent and that said Letters Patent is hereby corrected as shown below:

In the Specification

In Column 1, Line 8, delete "2020," and insert -- 2020, now Pat. No. 11,071,054, --, therefor.

In Column 4, Line 27, delete "(Globally Unique Temporary UE Identity)" and insert -- (Globally Unique Temporary Identity) --, therefor.

In the Claims

In Column 14, Line 56, in Claim 27, delete "claim 26 the" and insert -- claim 26 wherein the --, therefor.

Signed and Sealed this
Nineteenth Day of September, 2023

Katherine Kelly Vidal
*Director of the United States Patent and Trademark Office*